US012592213B2

(12) United States Patent
Leneman

(10) Patent No.: US 12,592,213 B2
(45) Date of Patent: Mar. 31, 2026

(54) TAP GUITAR PICK

(71) Applicant: Michael Leneman, Los Angeles, CA (US)

(72) Inventor: Michael Leneman, Los Angeles, CA (US)

( * ) Notice: Subject to any disclaimer, the term of this patent is extended or adjusted under 35 U.S.C. 154(b) by 266 days.

(21) Appl. No.: 18/199,789

(22) Filed: May 19, 2023

(65) Prior Publication Data

US 2024/0386869 A1 Nov. 21, 2024

(51) Int. Cl.
*G10D 3/173* (2020.01)

(52) U.S. Cl.
CPC .................................... *G10D 3/173* (2020.02)

(58) Field of Classification Search
CPC ................................ G10D 3/173; G10D 3/00
See application file for complete search history.

(56) References Cited

U.S. PATENT DOCUMENTS 3,789,720 A 2/1974 McIntyre
4,879,940 A * 11/1989 Pereira .................. G10D 3/173 84/322
8,664,498 B2 3/2014 Leneman
2005/0211053 A1* 9/2005 Ball ...................... G10D 3/173 84/322
2017/0221459 A1* 8/2017 Caccia .................. G10D 3/173

* cited by examiner

*Primary Examiner* — Kimberly R Lockett
(74) *Attorney, Agent, or Firm* — KELLY & KELLEY, PLLC

(57) ABSTRACT

A guitar pick includes a cylinder band having a first open end and a second open end for insertion of a fingertip therethrough. A plectrum is disposed on the band having a generally triangular or teardrop configuration with a string engaging tip. A thumb rest on a top surface of the plectrum enables the user to pick the strings of an instrument or move the guitar pick along a length of the user's finger for a variety of playing styles.

12 Claims, 24 Drawing Sheets

TAP GUITAR PICK

FIELD OF THE INVENTION

The present generally relates to guitar picks. More particularly, the present invention relates to a guitar pick adjustably positionable on a finger of a player enabling different playing styles.

BACKGROUND OF THE INVENTION

A plectrum, also referred to as a pick, is a thin flat piece of plastic, tortious shell or other slightly flexible material held by the fingers of a user to pluck the strings of a musical instrument, such as a guitar. The plectrum is typically shaped like a pointed teardrop or triangle.

In the playing of guitars, banjos and similar stringed instruments it is common to practice using a semi-rigid handheld pick to pluck the strings by appropriate manual manipulations. With reference to FIG. 1, the plectrum 10 is normally held between the thumb 14 and the forefinger 12 of a player, as illustrated. FIG. 1 illustrates a typical position of holding and strumming guitar strings 16 utilizing a pick 10. If fast picking or hard picking is performed, the user's index finger 12 and the pick 10 will move closer to the user's palm for additional support.

It requires some effort and training for proper usage of the pick. The training needed to achieve proper holding and usage of the guitar pick involves determining the most natural and comfortable position while simultaneously considering the correct distance that the pick should extend from between the player's thumb 14 and forefinger. This distance is critical for achieving proper tone enabling the player to easily reach the several strings of the instrument.

With reference to FIG. 2, when tapping, the pick 10 is not used and instead the fingers 12 of the picking hand are used to tap the strings 16 on the fret of the guitar or other instrument. The pick 10 is completely moved away from the strings 16 and held in place by at least one finger into the palm of the musician, as shown in FIG. 2, so that it is available again for strumming or hard picking during a different portion of the song or a different song. However, a disadvantage of this, as illustrated in FIG. 2, is that not all of the user's fingers will be available to tap the strings 16.

Accordingly, there is a continuing need for a guitar pick that enables the player to use the guitar pick for different styles, including strumming or fast picking as well as being moved conveniently out of the way and enabling all of the player's fingers and thumb to be used when tapping. The present invention fulfills these needs and provides other related advantages.

SUMMARY OF THE INVENTION

The present invention resides in a guitar pick. The guitar pick enables the user to conveniently selectively move the plectrum, or pick portion, so as to play different styles, including strumming, fast or hard picking, or even tapping using the user's fingers.

The guitar pick generally comprises a generally cylindrical band having a first open end and a second open end for insertion of a fingertip of the player therethrough. The band may have a semi-cylindrical flexible diameter, with a gap formed between adjacent side edges of the band. A nodule may be formed on an inner surface of the band for reducing finger-band inner surface contact area and enabling the band to slide along a length of the finger.

A plectrum is disposed on the band. The plectrum has a generally triangular or teardrop configuration. The plectrum defines a string engaging tip and a thumb rest formed on a top surface thereof.

A first riser may extend from an upper surface of the plectrum, adjacent to the thumb rest. The first riser may comprise a plurality of spaced apart projections. A second riser may extend from the upper surface of the plectrum in spaced relation to the first riser. Typically, the thumb rest is disposed between the first and second risers.

The plectrum may be detachably connected from the band. For example, the band may include a post having an enlarged free end which is insertable into an aperture of the plectrum. A channel may extend from the plectrum aperture that slidably receives the post therein.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
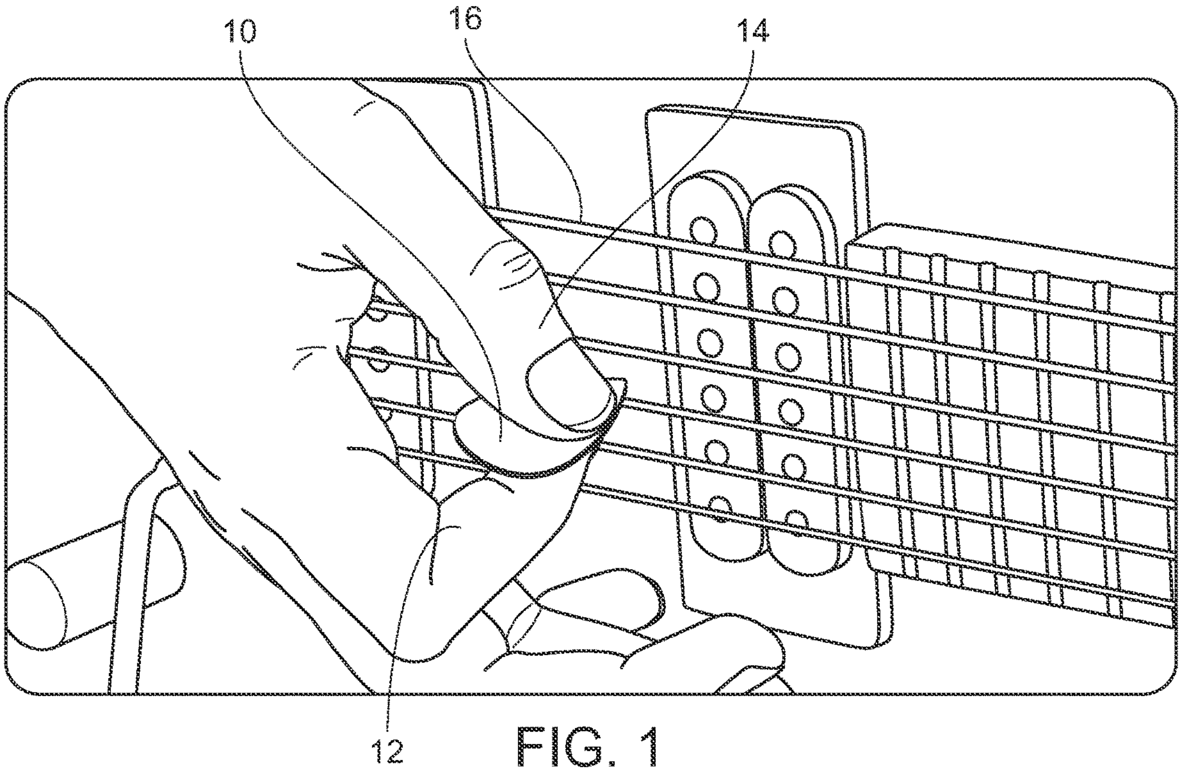
FIG. 1 (PRIOR ART)
FIG. 1 is a prior art environmental perspective view of guitar strings being played with a traditional pick.
Figure 2:
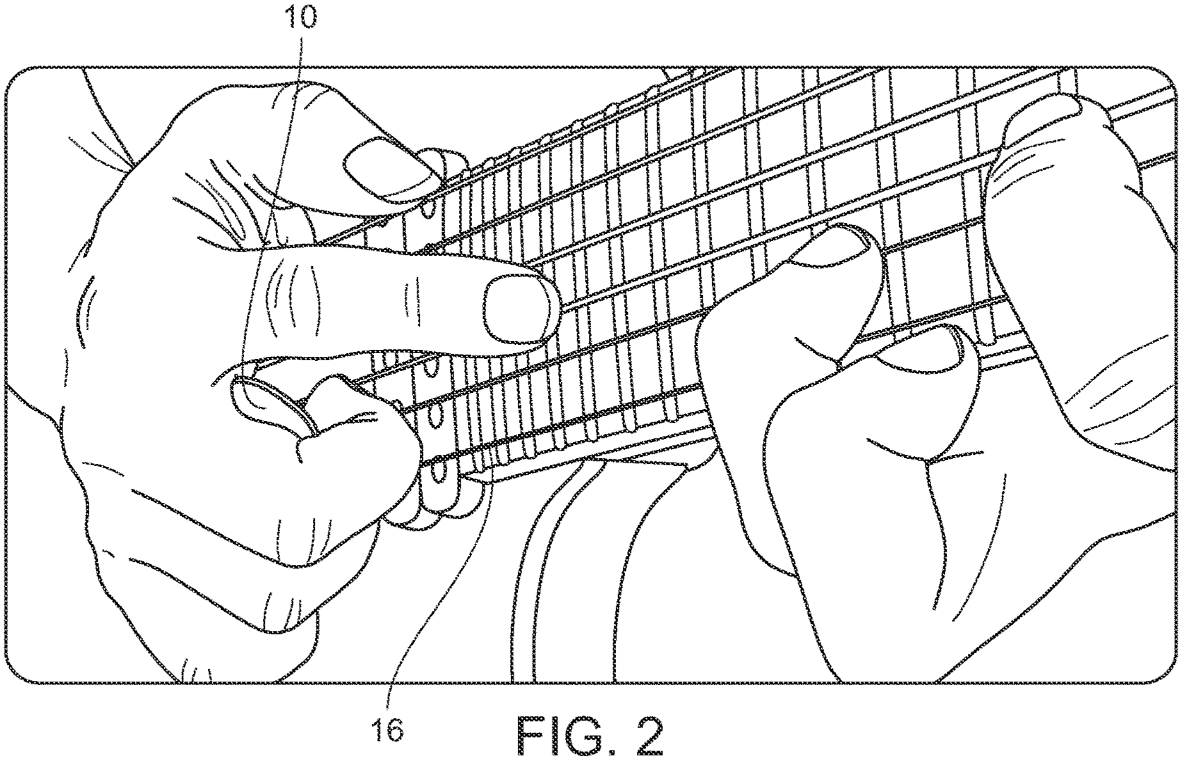
FIG. 2 (PRIOR ART)
FIG. 2 is a prior art environmental view similar to FIG. 1, illustrating the pick being held to allow tapping of the guitar strings.

As shown in the accompanying drawings, for purposes of illustration, the present invention is directed to a guitar pick. The guitar pick of the present invention overcomes many of the deficiencies of traditional guitar picks, including the ability to easily enable a player to play different playing styles, including strumming, fast or hard picking, and tapping in a more efficient and convenient manner.

With reference now to FIG. 3-8, a guitar pick 100 embodying the present invention is shown. The guitar pick 100 includes a generally cylindrical band 102 having a first open end 104 and a second open end 106 for insertion of the band 102 and guitar pick 100 onto a finger 12 of a user, such as by insertion of a fingertip 18 through the first and second openings 104 and 106 until the band 102 is at a desired position on the finger 12. Typically, as illustrated, a portion of the finger, including the fingertip 18, extends outwardly from the band 102.

As shown in various figures, including FIGS. 4 and 8-10, the band 102 has a semi-cylindrical flexible diameter, including a gap 108 formed between adjacent side edges 110 and 112. The guitar pick 100 is comprised of a material, such as plastic, which provides a desired degree of flexibility. Preferably, the material used, such as plastic, can be molded into the guitar pick, although other materials and methods of manufacture are contemplated by the present invention. Incorporating the gap 108 between the opposing side edges 110 and 112 of the semi-cylindrical band 102 provides a degree of flexibility such that users' fingers of various diameters may be able to slide the guitar pick 100 thereon. Providing the gap 108 also serves to reduce the surface contact between the outer surface of the user's finger 12 and the inner surface of the band 102, enabling the user to more easily selectively slide the guitar pick 100 onto and up and down the user's finger 12, as desired.

Figure 9:
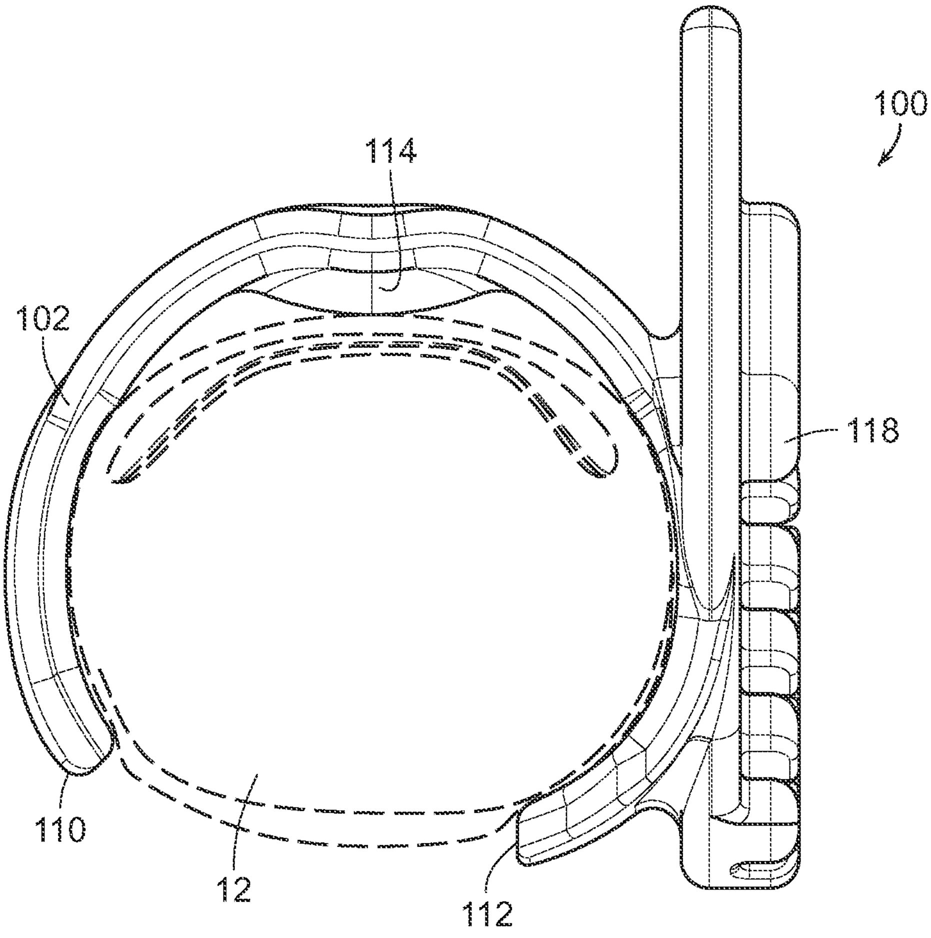
FIG. 9 is an end view of FIG. 3.
Figure 10:
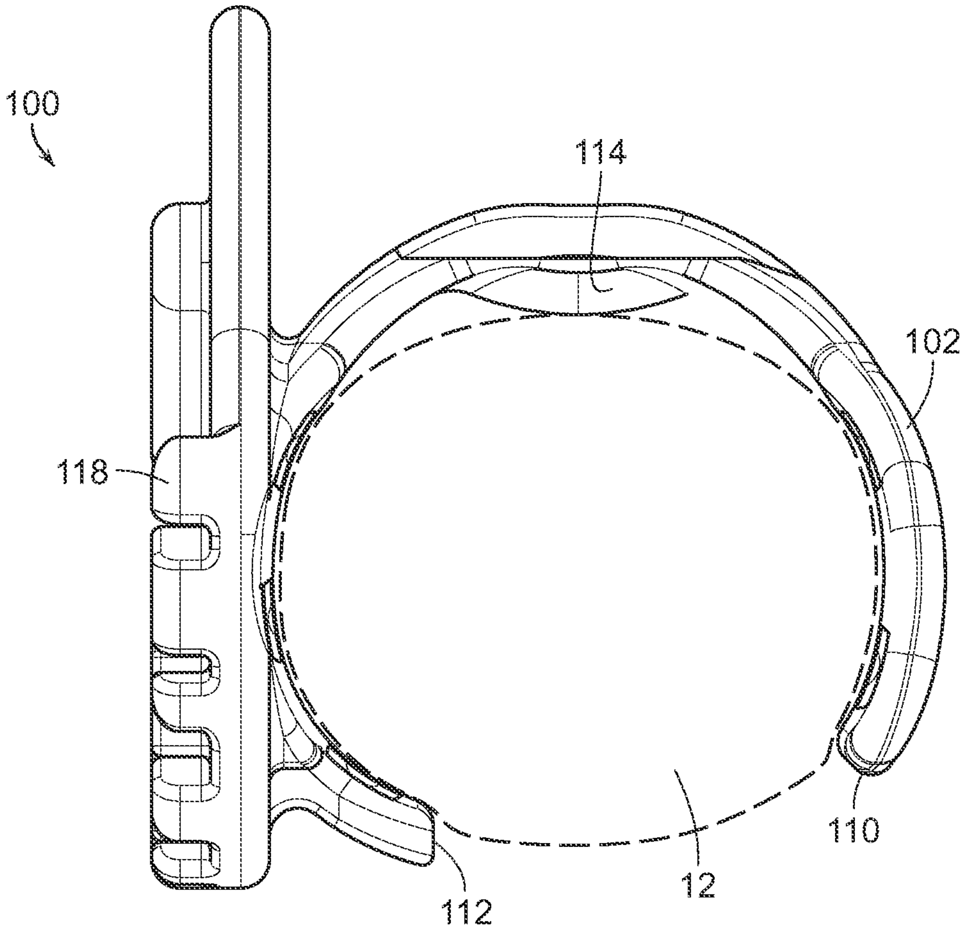
FIG. 10 is an opposite end view of FIG. 9.

With reference now to FIGS. 9 and 10, in order to further reduce finger-band inner surface contact area, a nodule 114 may be formed on an inner surface of the band 102. The nodule 114 may be formed as a depression in the band 102, a protrusion from an inner surface of the band 102 or the like. The nodule 114, as illustrated in FIGS. 9 and 10, causes a portion of the finger 12, as illustrated in an upper portion of the finger, to contact the nodule 114, which may be convex in shape, as illustrated, such that only the upper portion of the finger contacting the nodule 114 contacts the inner surface of the band 102. Due to the decreased friction, the band 102 is more easily slid onto and along a length of the finger, as desired.

Figure 4:
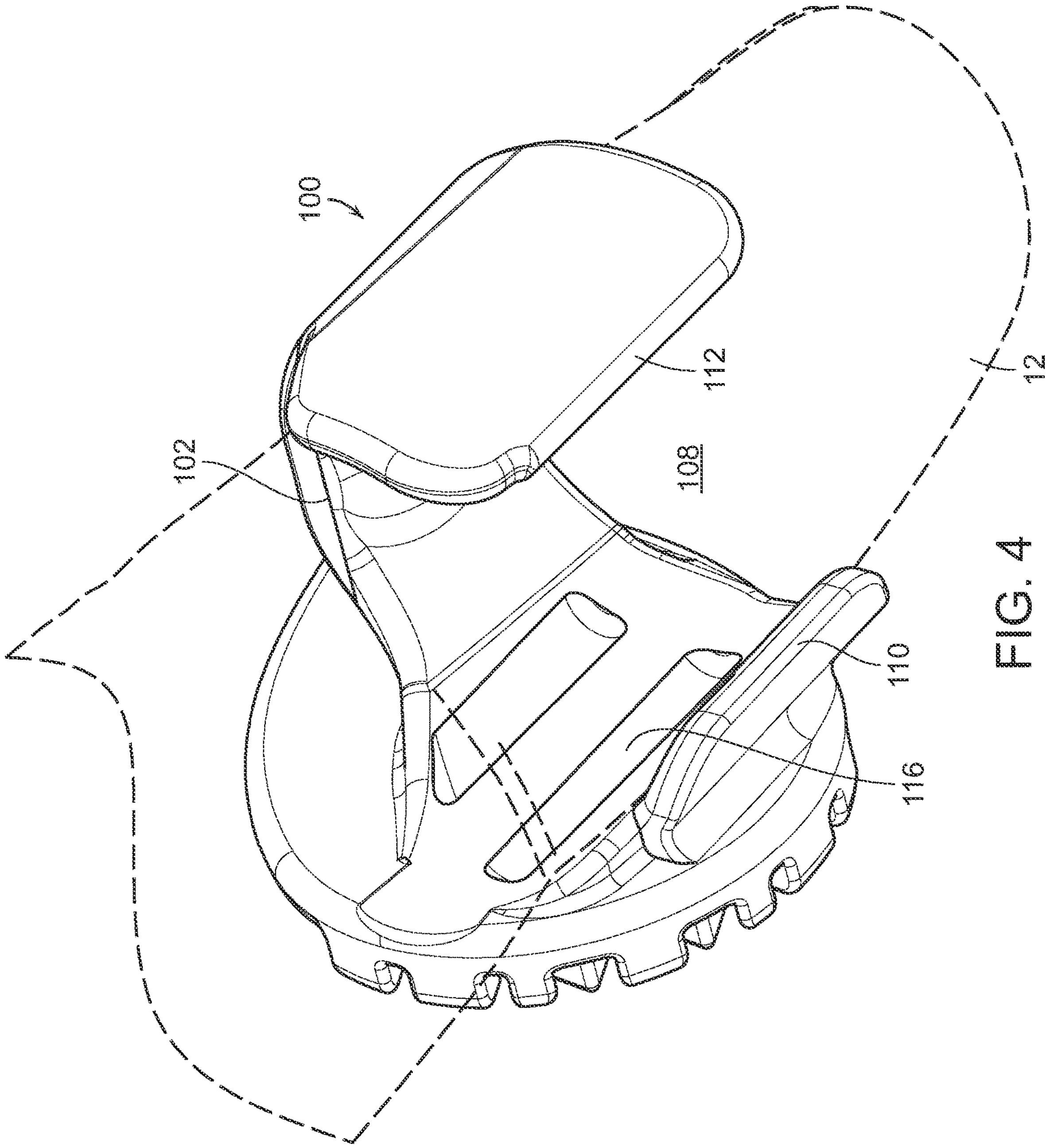
FIG. 4 is a rear perspective view of FIG. 3.
Figure 5:
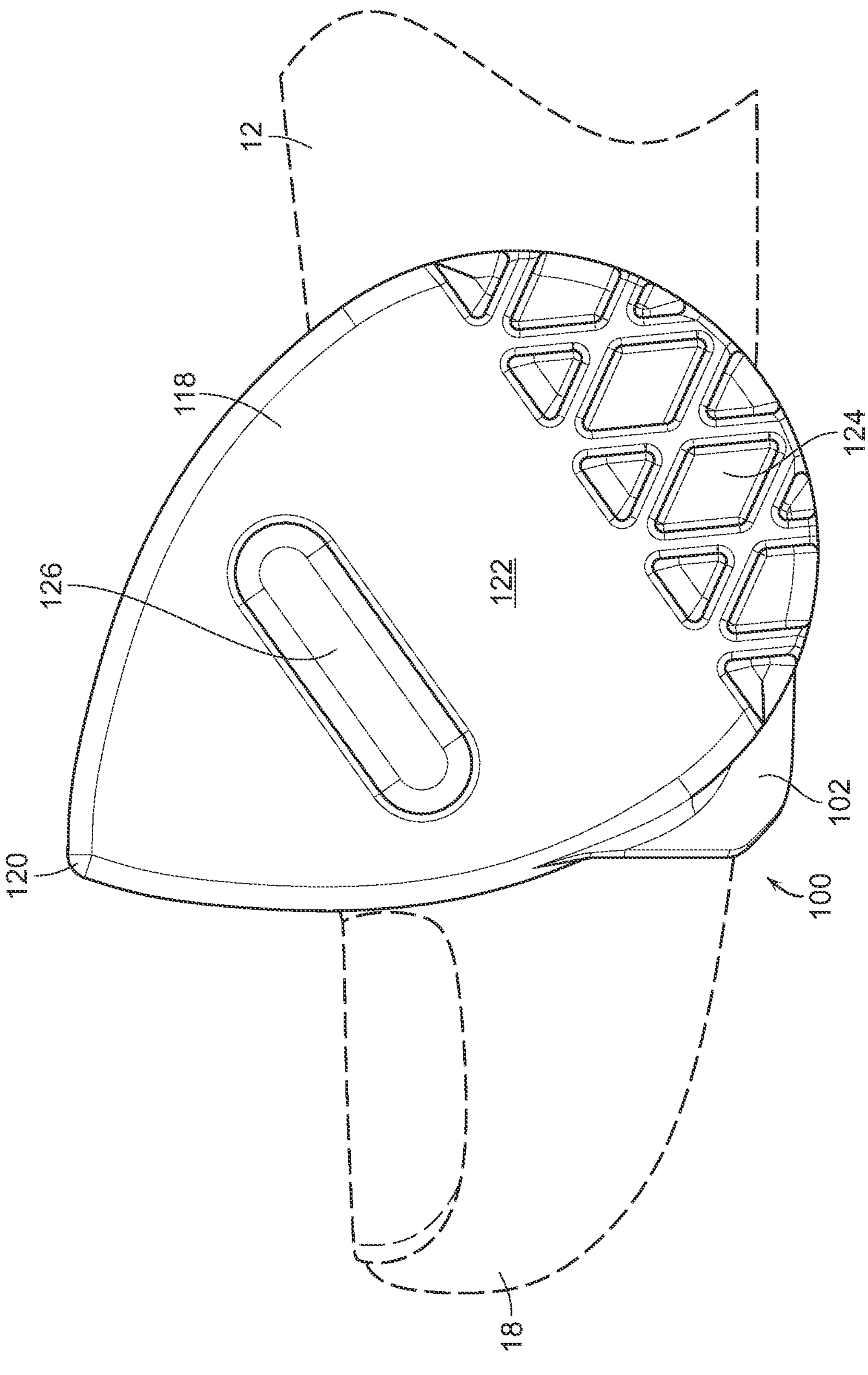
FIG. 5 is a side perspective view of FIG. 3.
Figure 6:
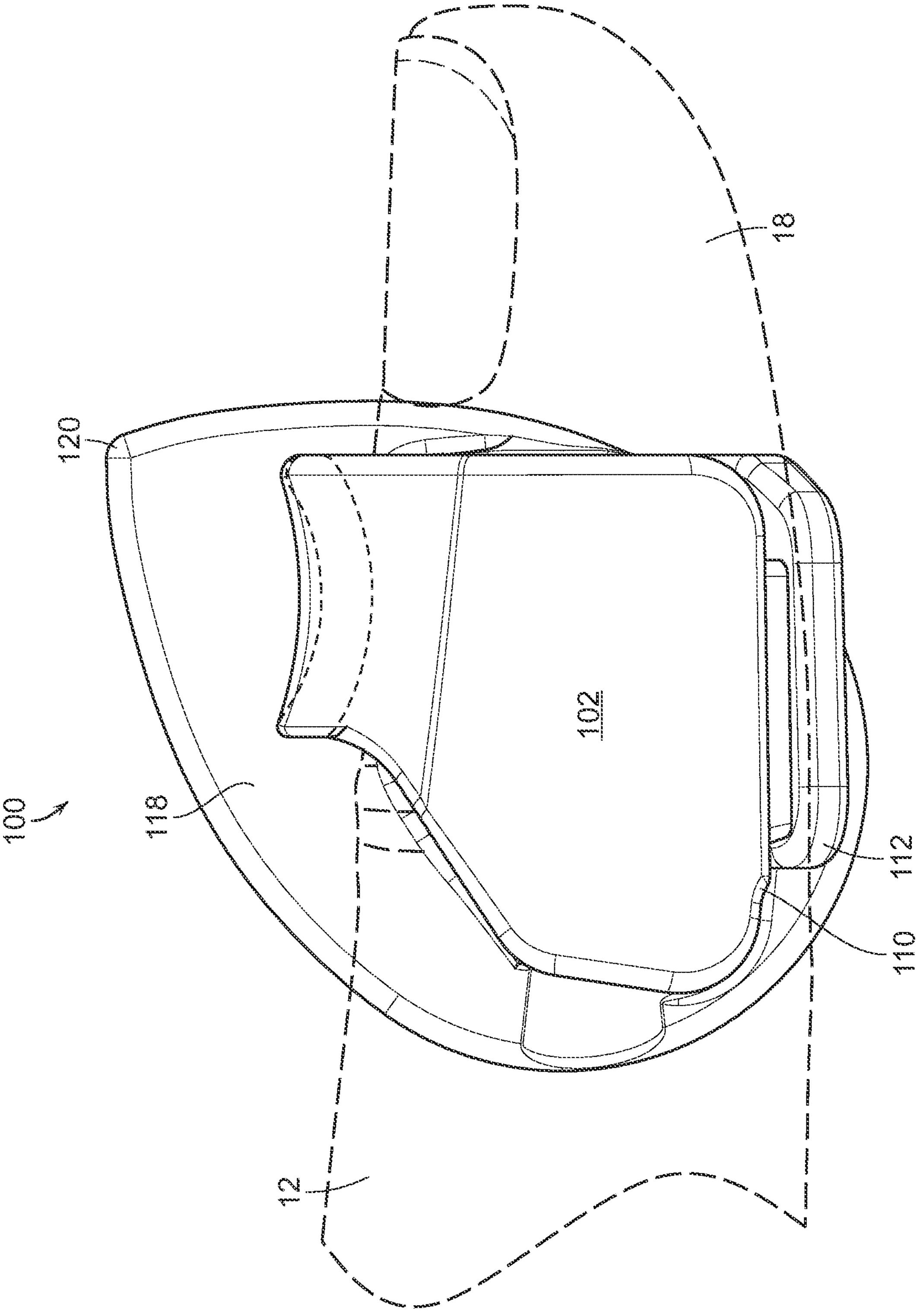
FIG. 6 is an opposite side view of FIG. 5.
Figure 7:
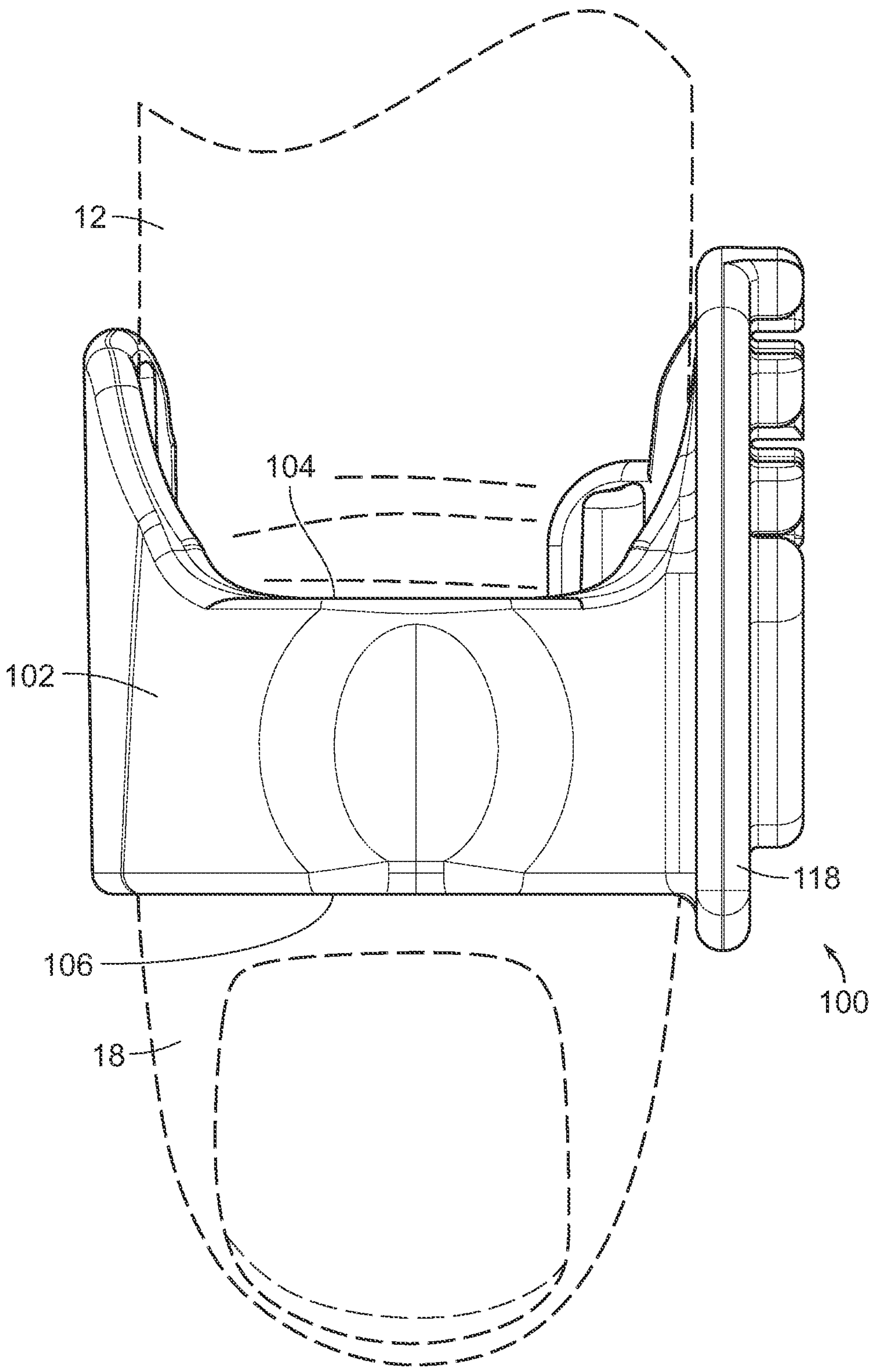
FIG. 7 is a top view of FIG. 3.
Figure 8:
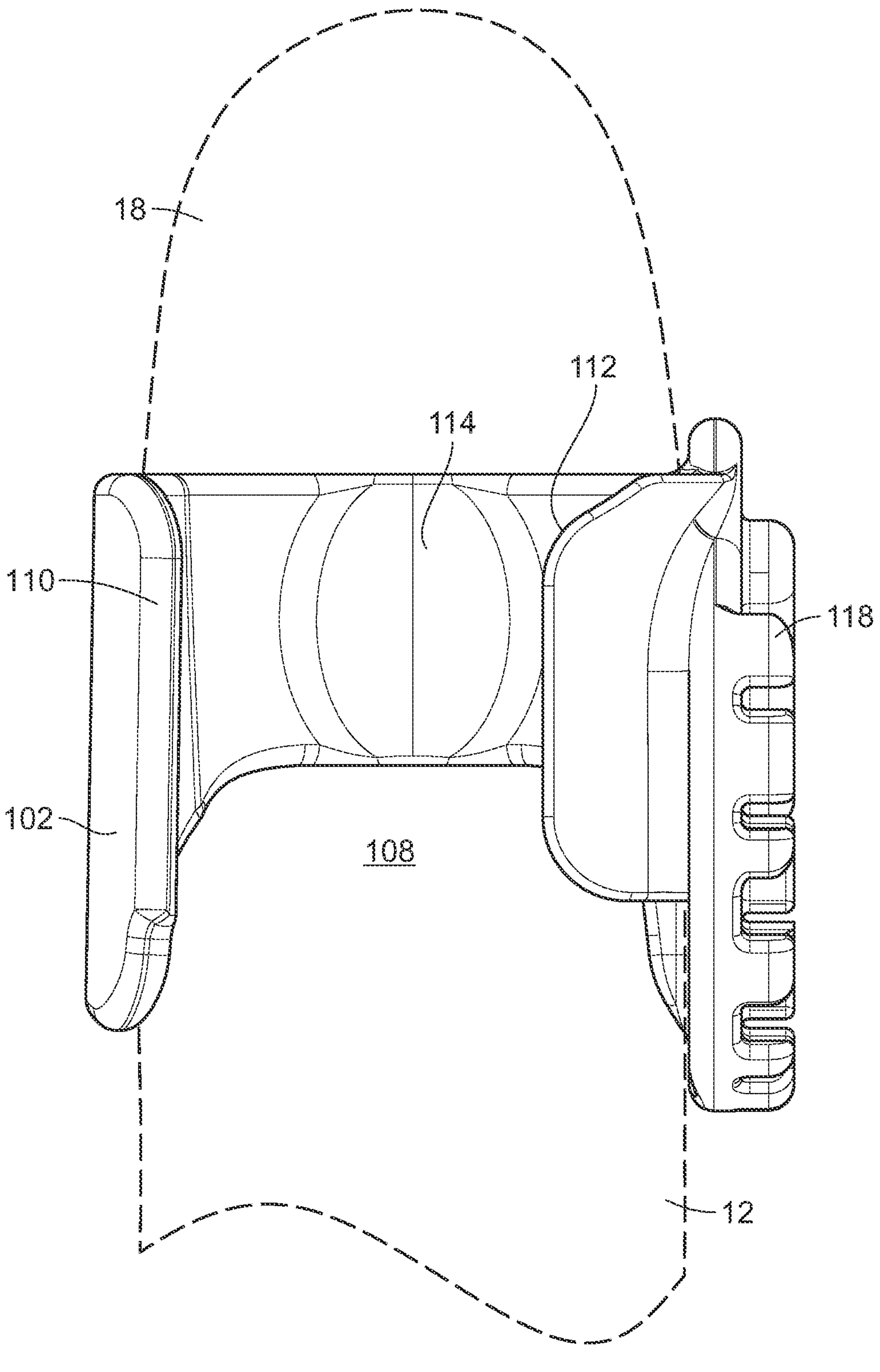
FIG. 8 is a bottom view of FIG. 3.

While it is desirable that the band 102, and thus the guitar pick 100, be selectively slidable onto and along a length of the finger 12, the band 102 should not be too loose a fit as it is desirable to position the band 102, and thus the guitar pick 100, at a desired position along the finger 12 and for the guitar pick 100 not to freely slide up and down, or even off, the finger 12 of the user. When playing, due to exertion and ambient conditions, the user's finger may become sweaty. Indentations 116, as shown in FIG. 4, may be formed on the inner surface of the band 102 into which a fleshy part of the finger 12 may extend into so that the band 102 remains in its desired position on the finger 12. Such indentations 116, as illustrated, may comprise elongated semi-cylindrical indentations. These indentations 116 may be a plurality of spaced apart indentations, as illustrated. The user, however, should still be able to selectively move the band 102 and thus the guitar pick 100 along a length of the finger, as desired.

With reference again to FIGS. 3-6, a plectrum 118 is disposed on the band 102. The plectrum 118 may be detachably connected to the band 102 or permanently attached to the band 102 or even integrally formed with the band 102 to form the guitar pick 100, as illustrated. The plectrum 118 has a generally triangular or teardrop configuration defining a string engaging tip 120 at an end thereof. The plectrum 118 is generally planar and has a thumb rest 122 formed on a top surface thereof, generally a substantially planar and central area of the top surface of the plectrum 118, as illustrated. This enables the user's thumb to come into contact with the top surface of the plectrum 118, at the thumb rest 122 to engage and controllably manipulate the guitar pick 100, such as when utilizing the guitar pick 100 to engage the strings of the guitar or other instrument.

A first riser 124 extends from an upper surface of the plectrum 118. The first riser 124 may extend upwardly from the surface of the plectrum 118 adjacent to the thumb rest area 122. The plectrum 118 may include a second riser 126 which extends from the upper surface of the plectrum 118 in spaced relation to the first riser 124. The first and second risers 124 and 126 may be disposed on generally opposite sides of the thumb rest 122, so as to be spaced apart from one another. The first and/or second riser 124 and 126 may comprise a single projection or bump extending from the upper surface of the plectrum 118, or may comprise a plurality of spaced apart projections. What is important is that the thumb of the user be able to engage the first and/or second risers 124 or 126 in order to push against the riser 124 or 126 and selectively move the guitar pick 100, such as up and down a length of the user's finger 12, typically between the tip 18 of the finger and a middle joint of the finger. In this manner, the user can selectively move the guitar pick 100 so as to ensure that the fingertip 18 of the user's finger 12 is fully exposed for tapping, or adjusting and moving the guitar pick 100 to different positions when strumming or fast picking or the like so as to properly position the guitar pick 100, and particularly the tip 120 of the plectrum 118 to pluck and pick the strings of the guitar or other stringed instrument.

Figure 11:
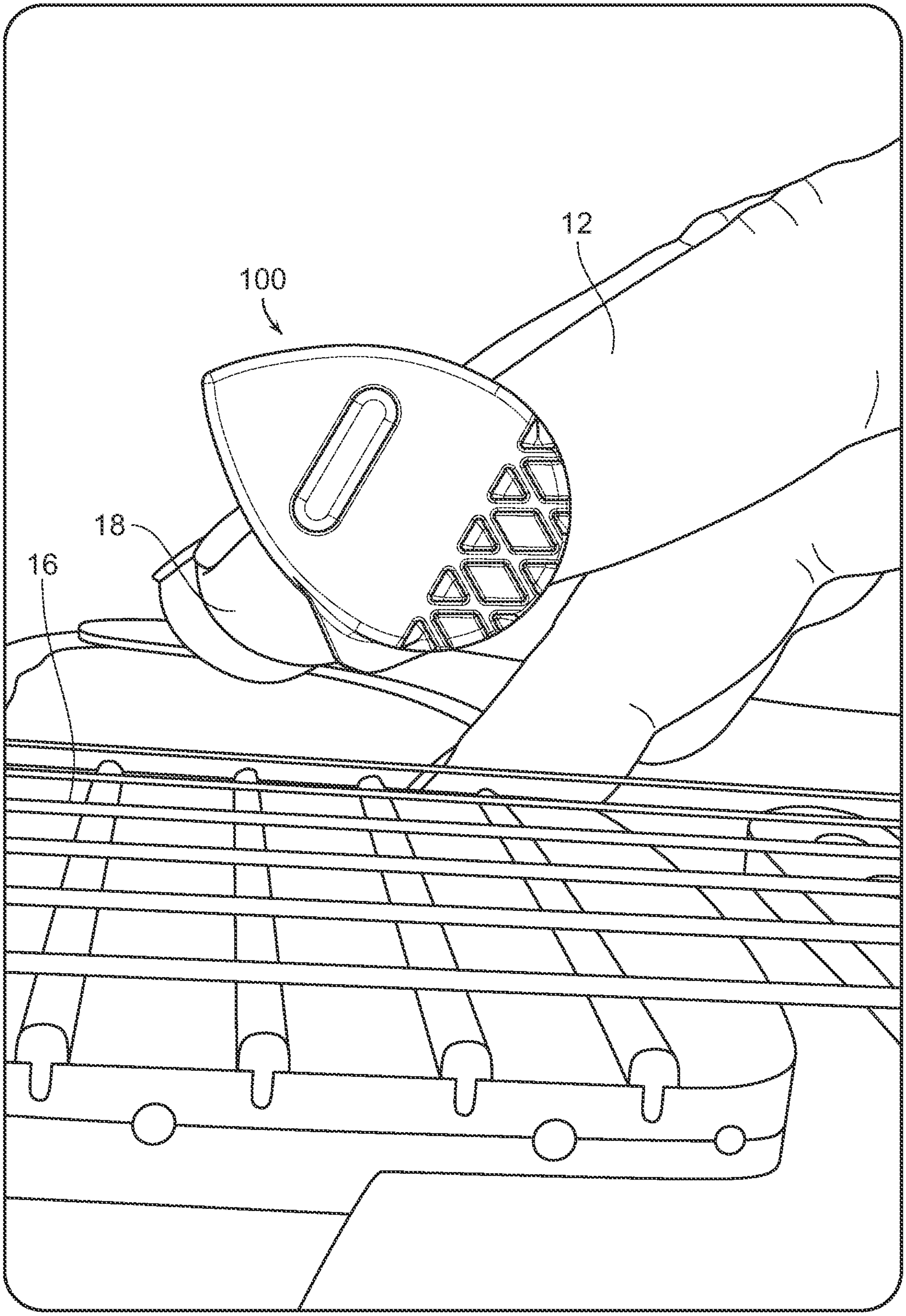
FIG. 11 is an environmental perspective view illustrating a guitar pick of the present invention disposed on a finger of a player of a stringed instrument, in accordance with the present invention.
Figure 12:
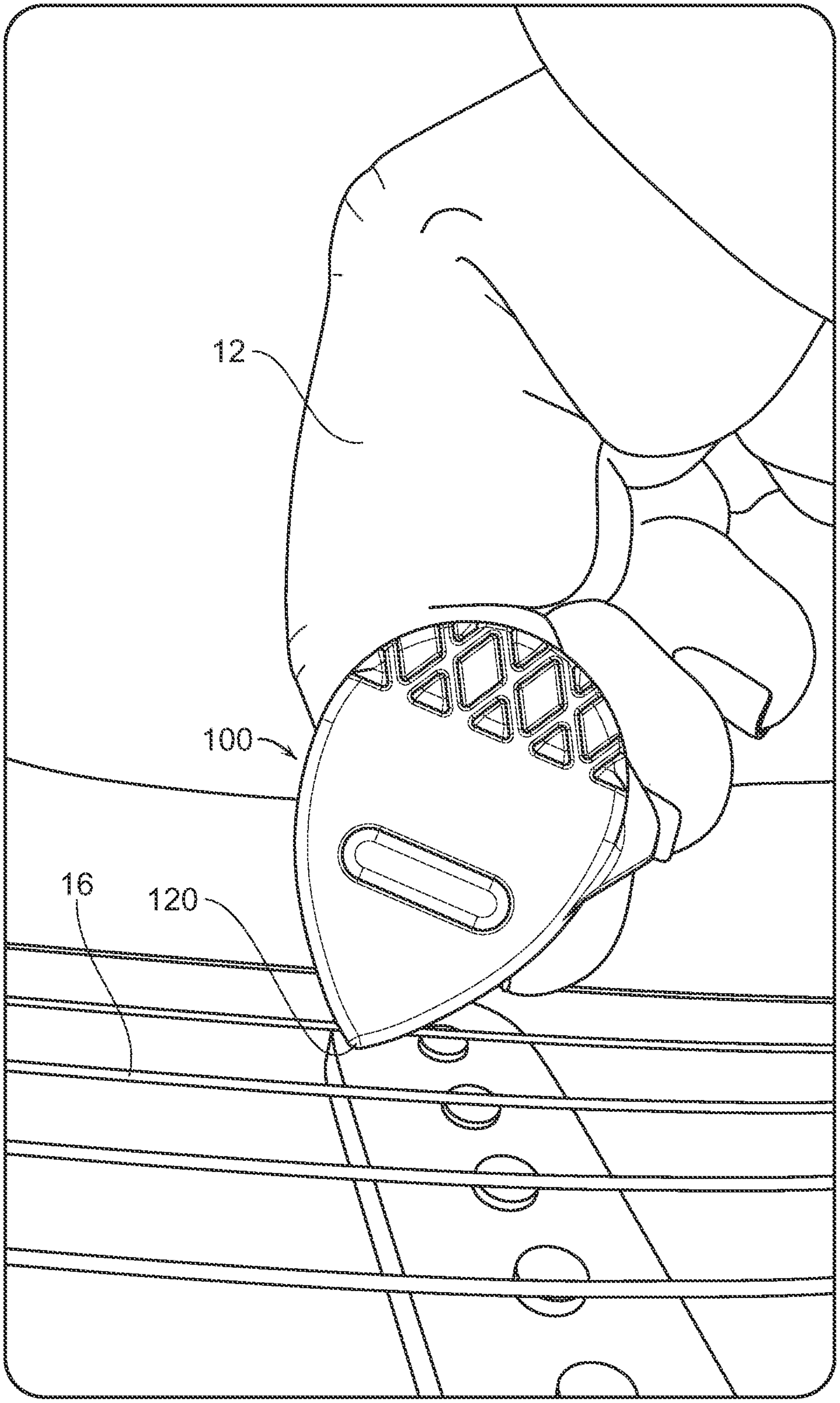
FIG. 12 is an environmental view similar to FIG. 11, and illustrating the fingers being moved into a strumming playing position.
Figure 13:
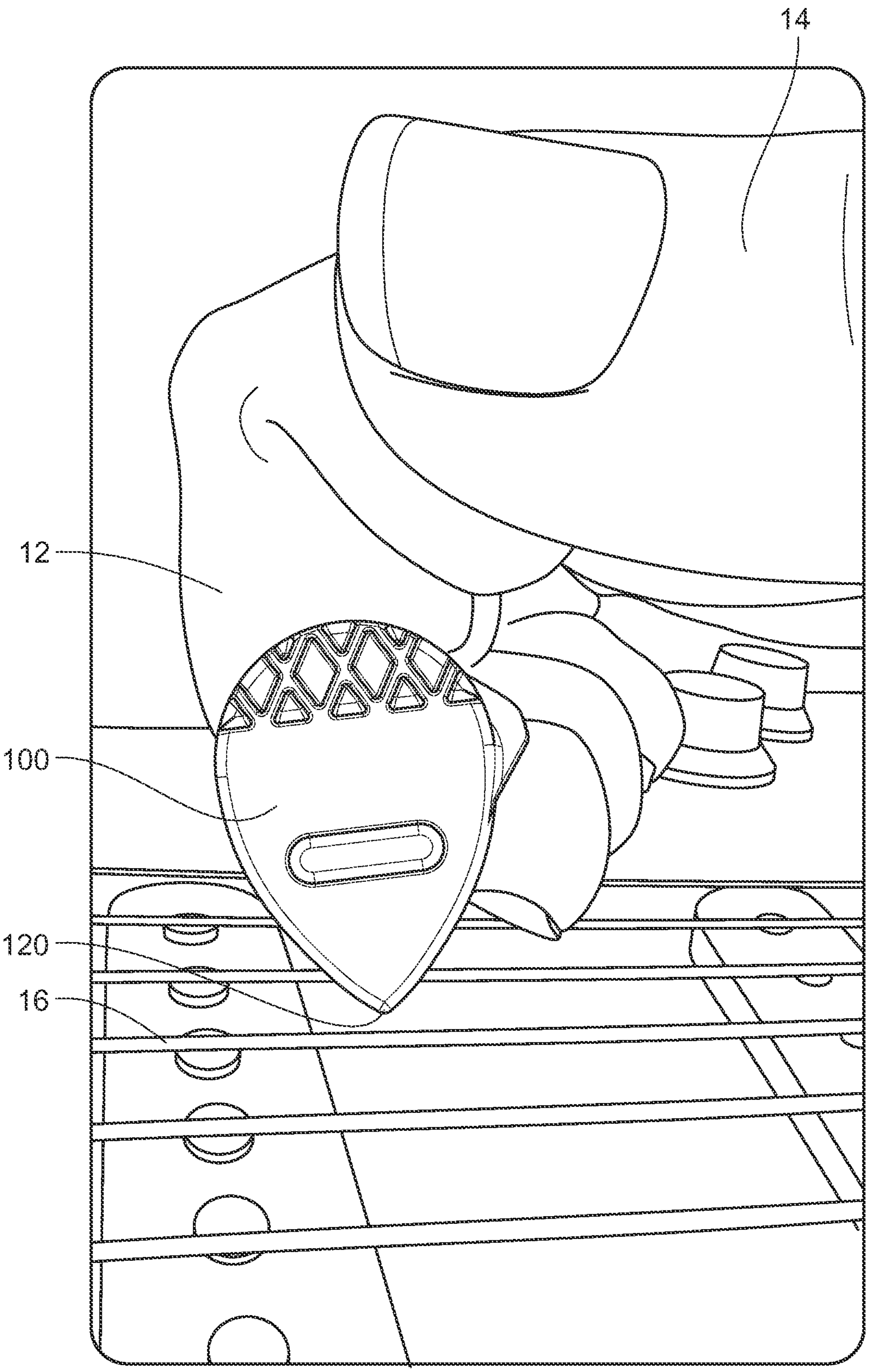
FIG. 13 is a similar view to FIG. 12, but illustrating the fingers curled inwardly into a fast picking position.

With reference now to FIG. 11, the guitar pick 100 of the present invention is shown on a finger 12 of a user such that the fingertip 18 is exposed, enabling the user to tap the strings 16 of the guitar or other instrument, utilizing all of the user's fingers, as desired. With reference now to FIGS. 12 and 13, the guitar pick 100 is shown disposed on the user's finger 12, but with the fingers moved into a playing position, wherein the string-engaging tip 120 of the guitar pick 100 is positioned so as to pluck or otherwise engage the strings 16 of the guitar or other instrument. FIG. 12 illustrates a position wherein the player may strum the guitar, with the user's thumb moved out of position for illustration purposes, whereas in FIG. 13 the user's fingers are more fully curled inward towards the palm for fast or hard picking of the strings 16. Due to the design and configuration of the guitar pick 100 the user is able to accomplish all of these playing styles while the guitar pick 100 remains disposed upon the user's finger 12. An advantage of the present invention is that it allows instantaneous switching between finger-style picking, such as where the nails of the thumb and adjoining three fingers pluck the strings simultaneously or independently, and standard plectrum picking.

The guitar pick 100 of the present invention also has other advantages. In some instances, the pick may be accidentally dropped. In the present invention, however, when the user removes his or her thumb the pick 100 stays in place upon the user's forefinger.

Figure 14:
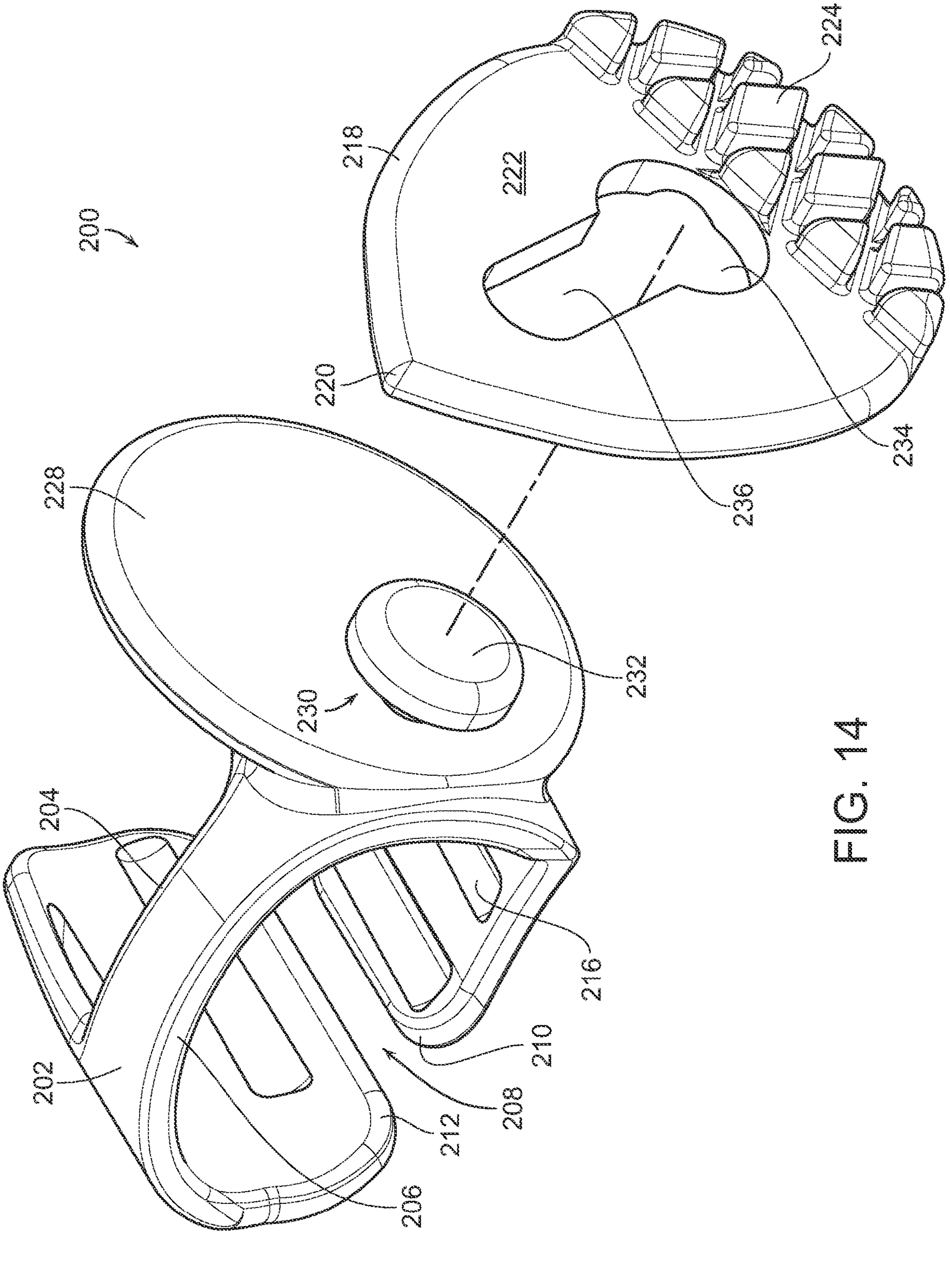
FIG. 14 is an exploded perspective view of a guitar pick embodying the present invention.

With reference now to FIG. 14, another guitar pick 200 embodying the present invention is illustrated. As mentioned above, the plectrum 218 may be integrally formed with the band 202, permanently affixed to the band 202, or detachably connected to the band 202, as is illustrated in FIG. 14. Similar to that described above, the band 202 is generally cylindrical, such as being semi-cylindrical, and having first and second open ends 204 and 206, through which a fingertip may be inserted through. A gap 208 is formed between adjacent side edges 210 and 212 of the band to provide a flexible diameter, as described above. The inner surface of the band may be smooth or may include indentations 216, as described above. The band 202 may be comprised of plastic, or other durable yet flexible material. Similar to that illustrated above, a nodule or projection or the like may be formed on an inner surface of the band 202 for reducing finger-band inner surface contact area, as described above.

The plectrum 218 is similar to that described above, in that it is generally triangular or of a teardrop configuration defining a string-engaging tip 220 at an end thereof. Preferably, at least one riser 224 extends upwardly from an upper surface of the plectrum 218, typically adjacent to a thumb rest area 222. The riser 224 may comprise a plurality of spaced apart projections, as illustrated. Otherwise, the plectrum 218 is generally planar. The band has a post 230, having an enlarged end 232, extending upwardly therefrom. Preferably, the band has a platform 228 from which the post 230 extends so as to support the plectrum 218.

Figure 15:
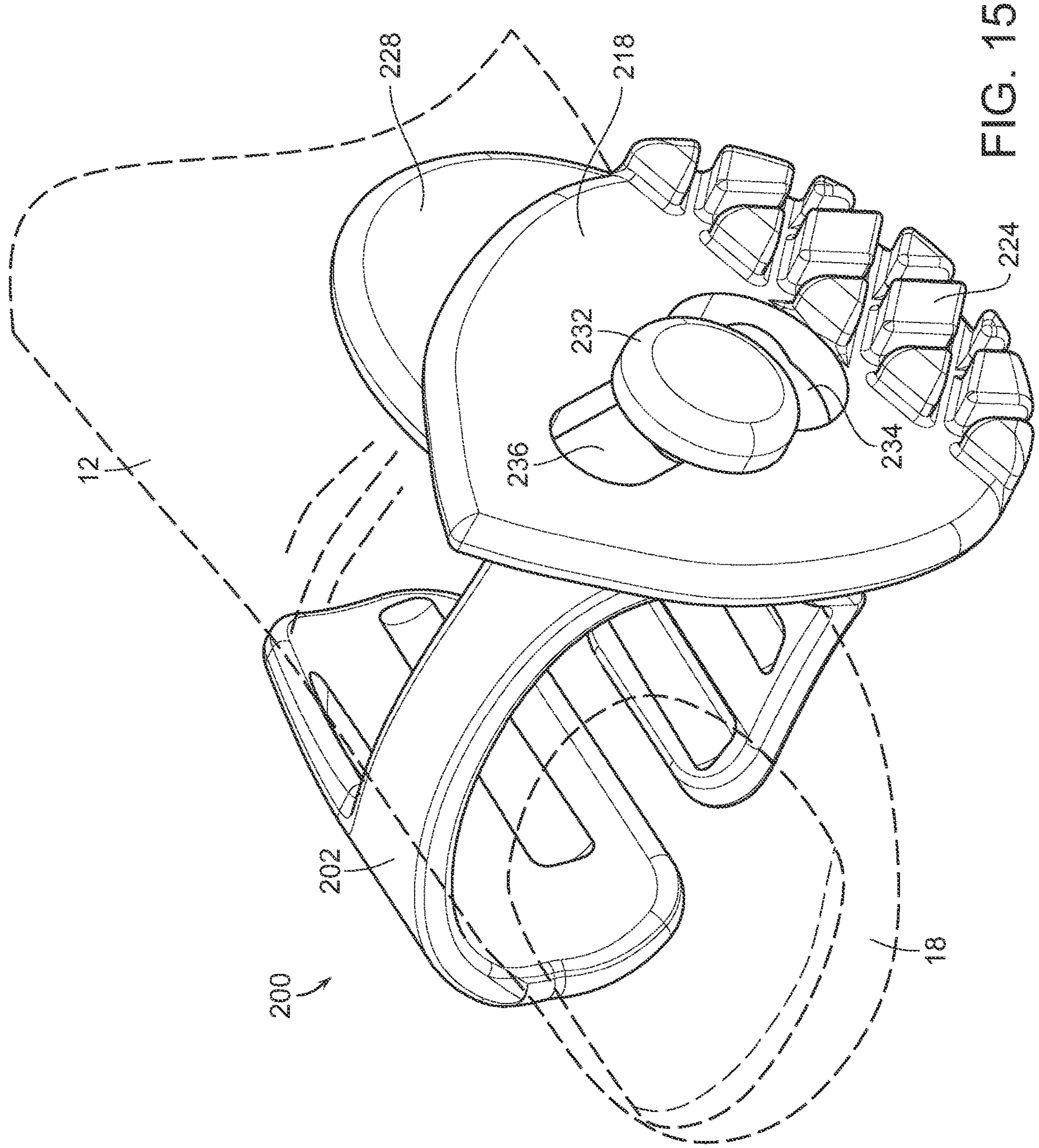
FIG. 15 is a side perspective view if the guitar pick of FIG. 14 disposed upon a finger of a user, in accordance with the present invention.
Figure 16:
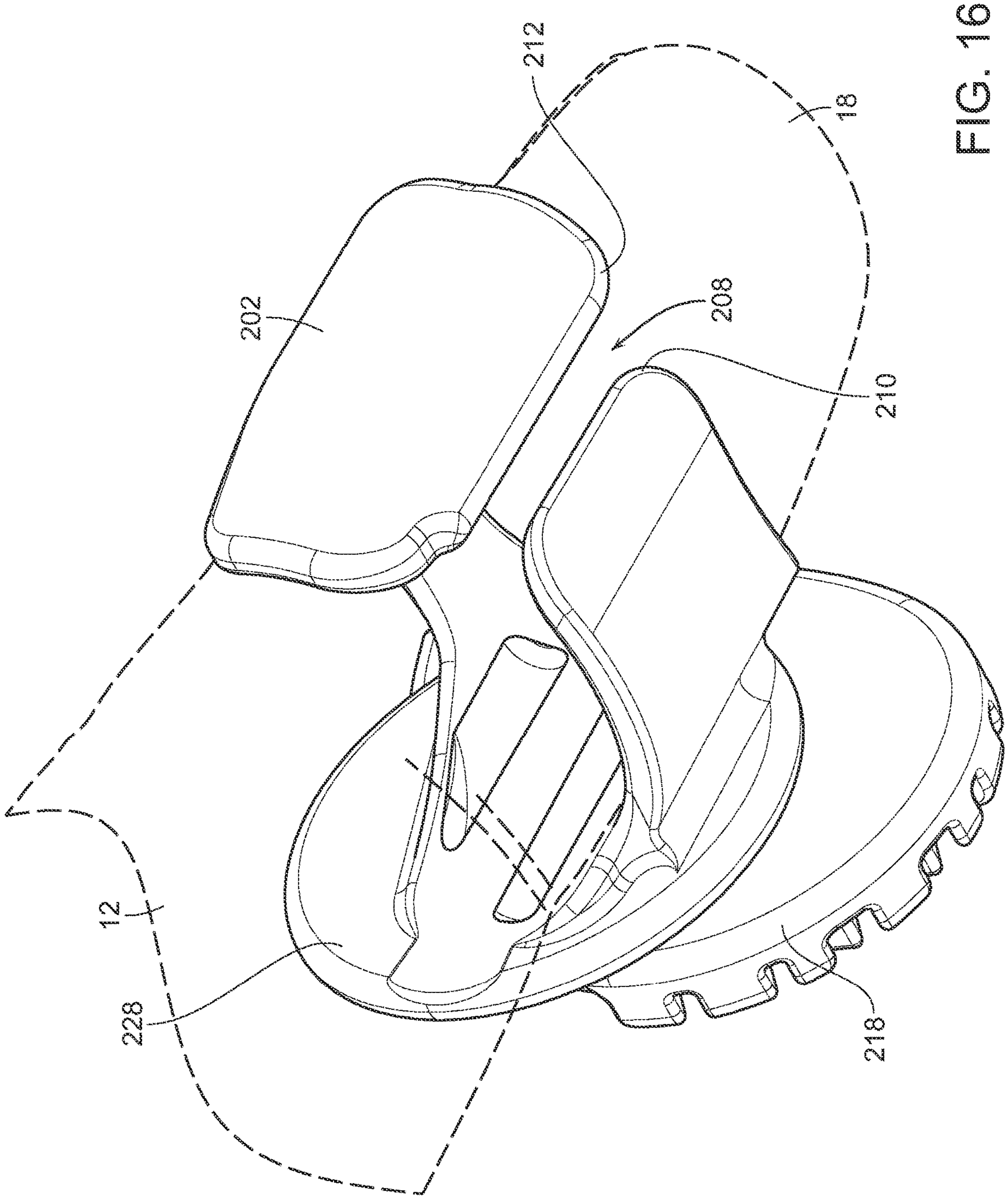
FIG. 16 is an opposite side perspective view of FIG. 15.
Figure 17:
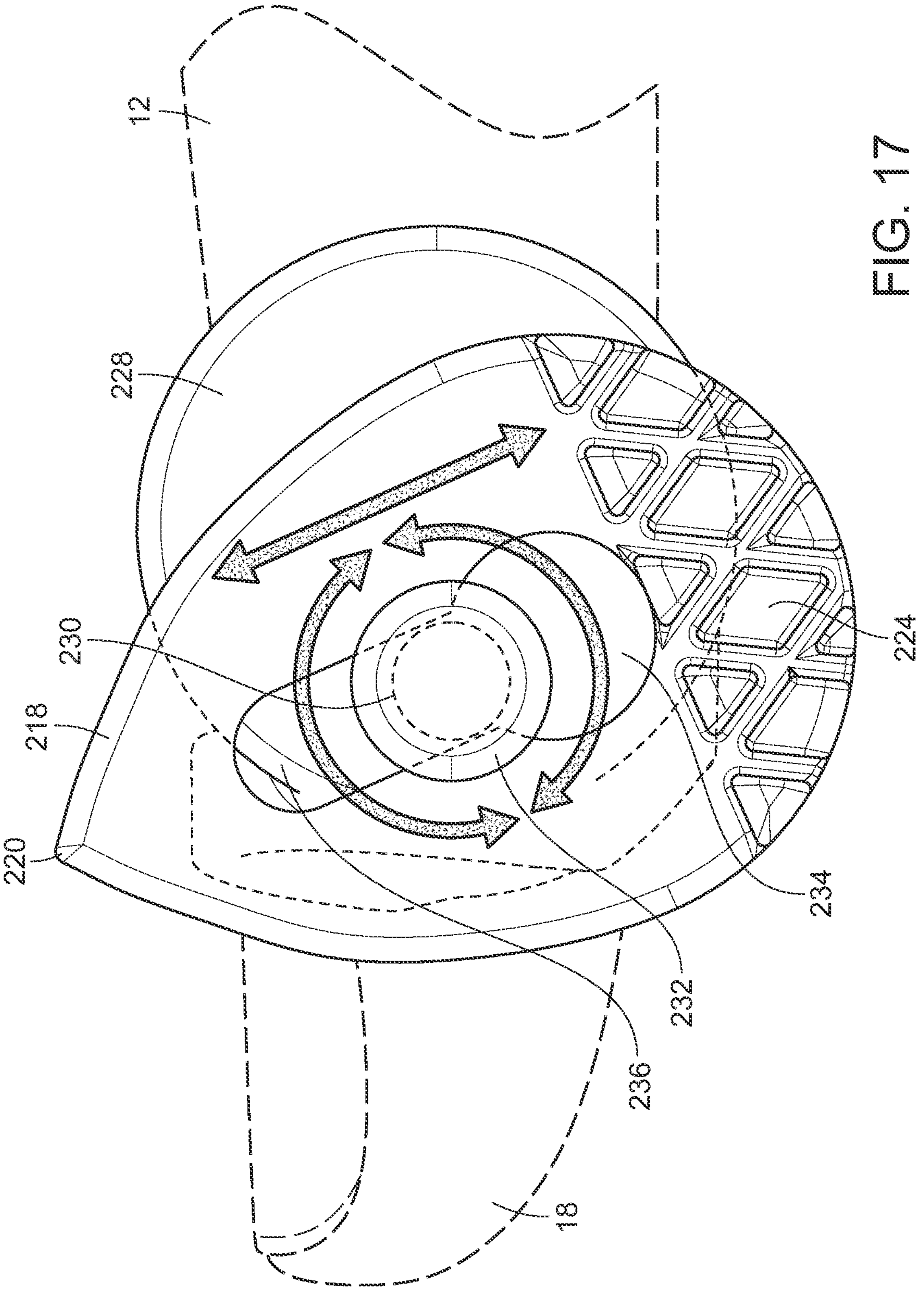
FIG. 17 is a side view of the guitar pick disposed upon a finger of a user, and illustrating adjustment of a plectrum of the guitar pick, in accordance with the present invention.
Figure 18:
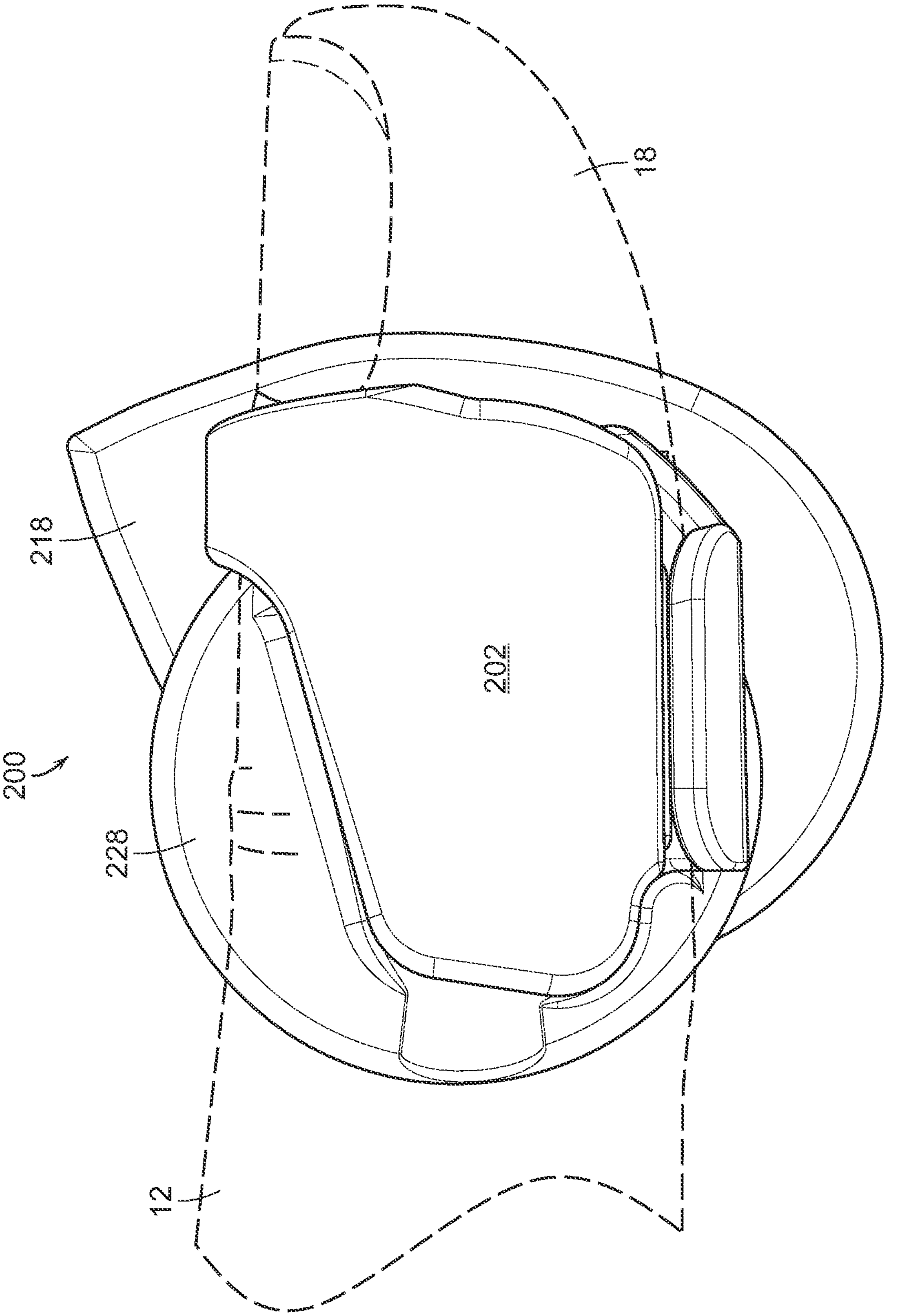
FIG. 18 is an opposite side view of FIG. 17.
Figure 19:
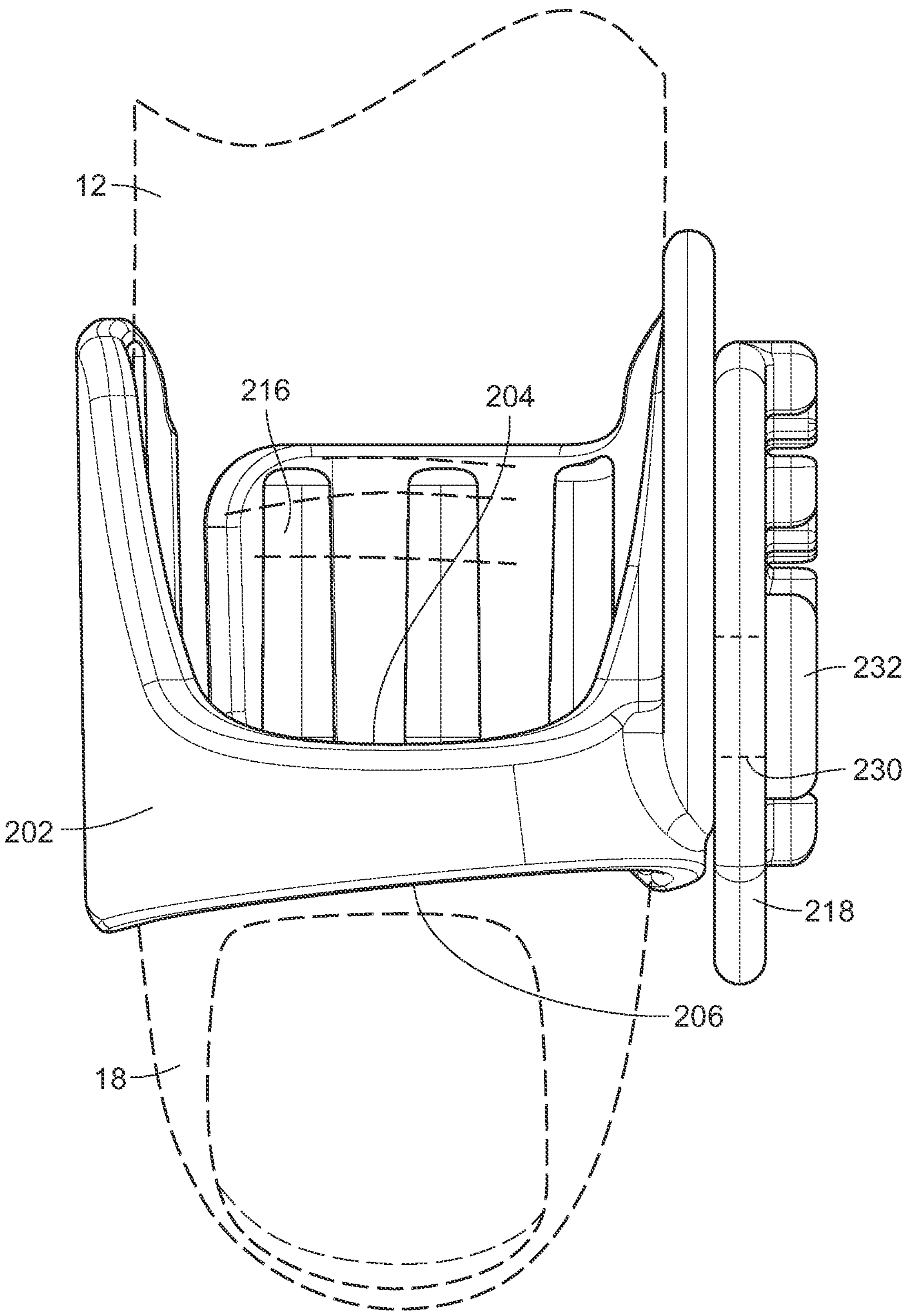
FIG. 19 is a top view of FIG. 15.
Figure 20:
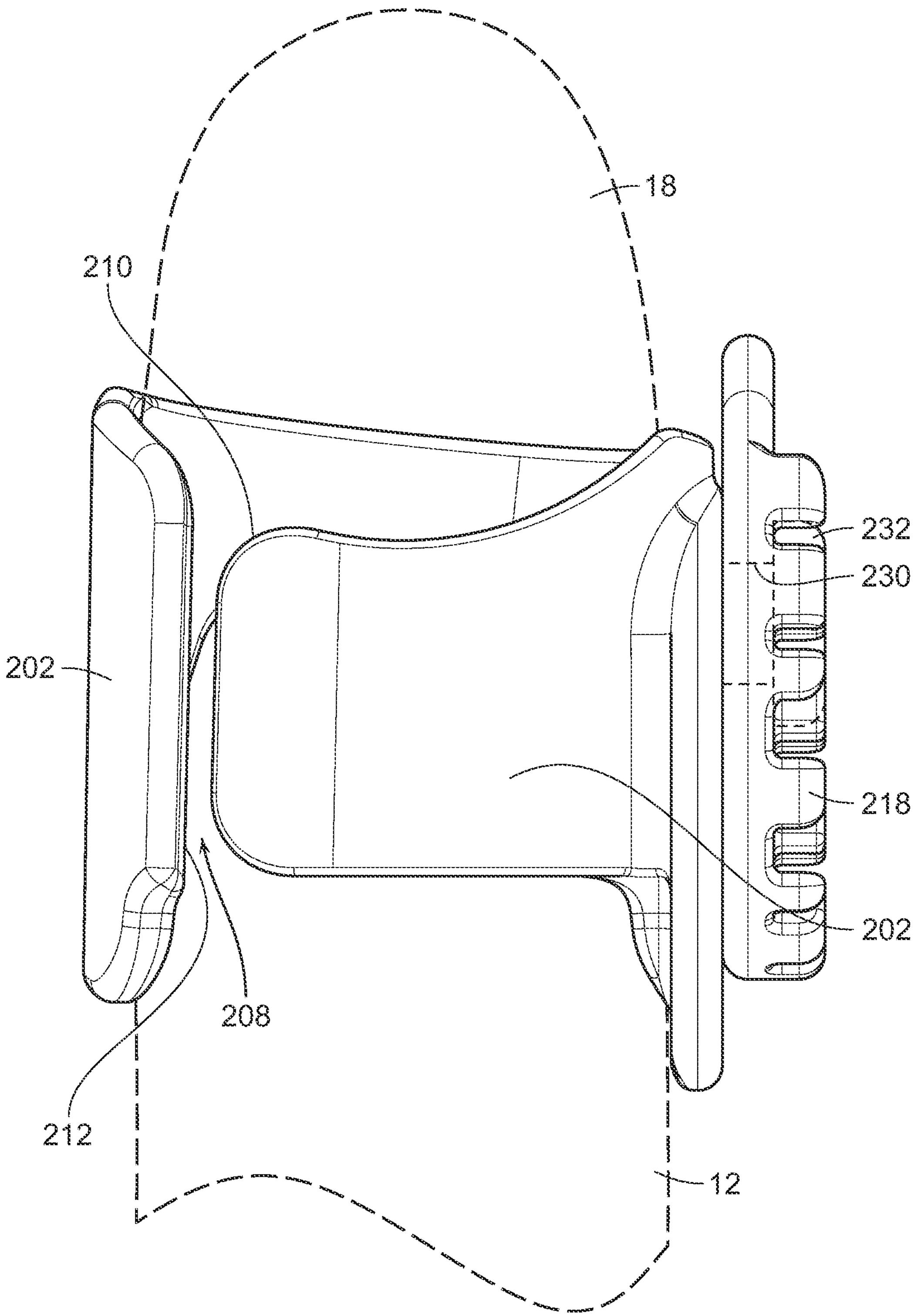
FIG. 20 is a bottom view of FIG. 15.
Figure 21:
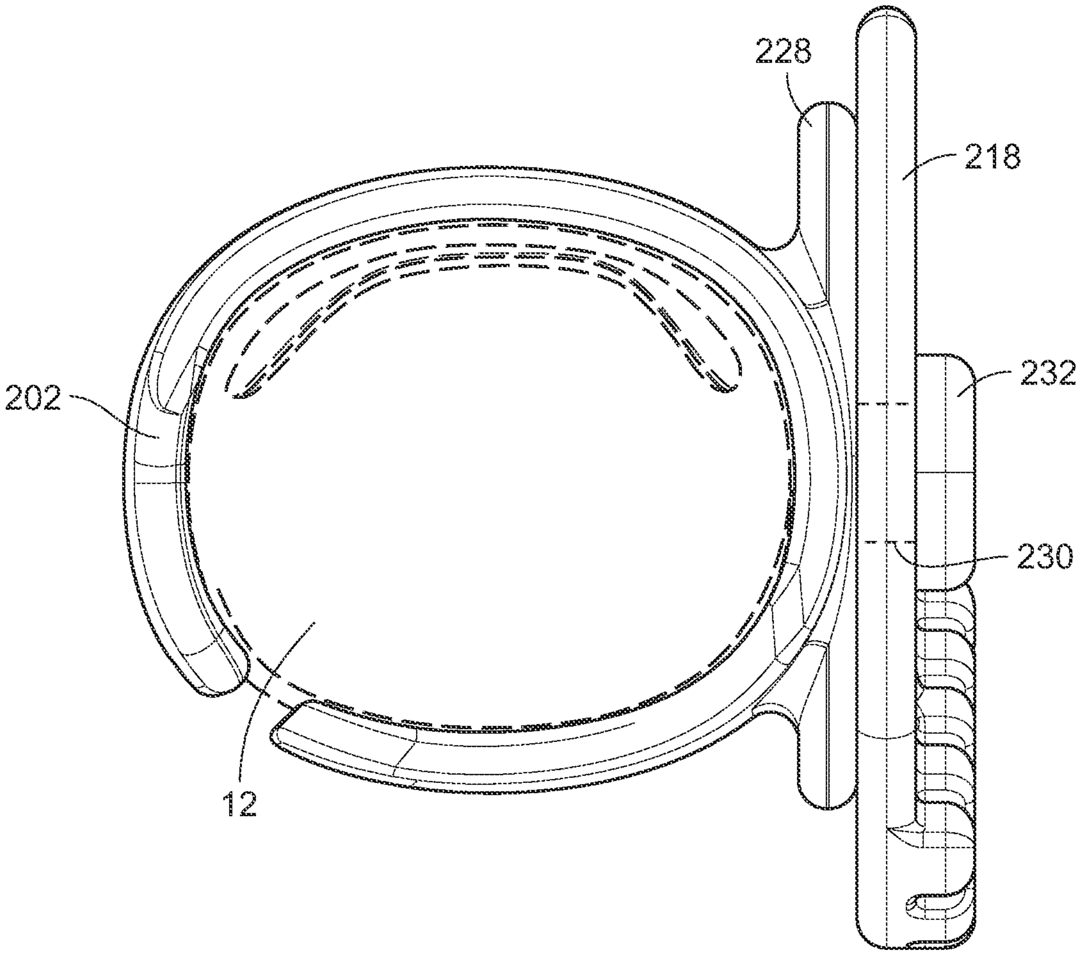
FIG. 21 is a front end view of FIG. 15.
Figure 22:
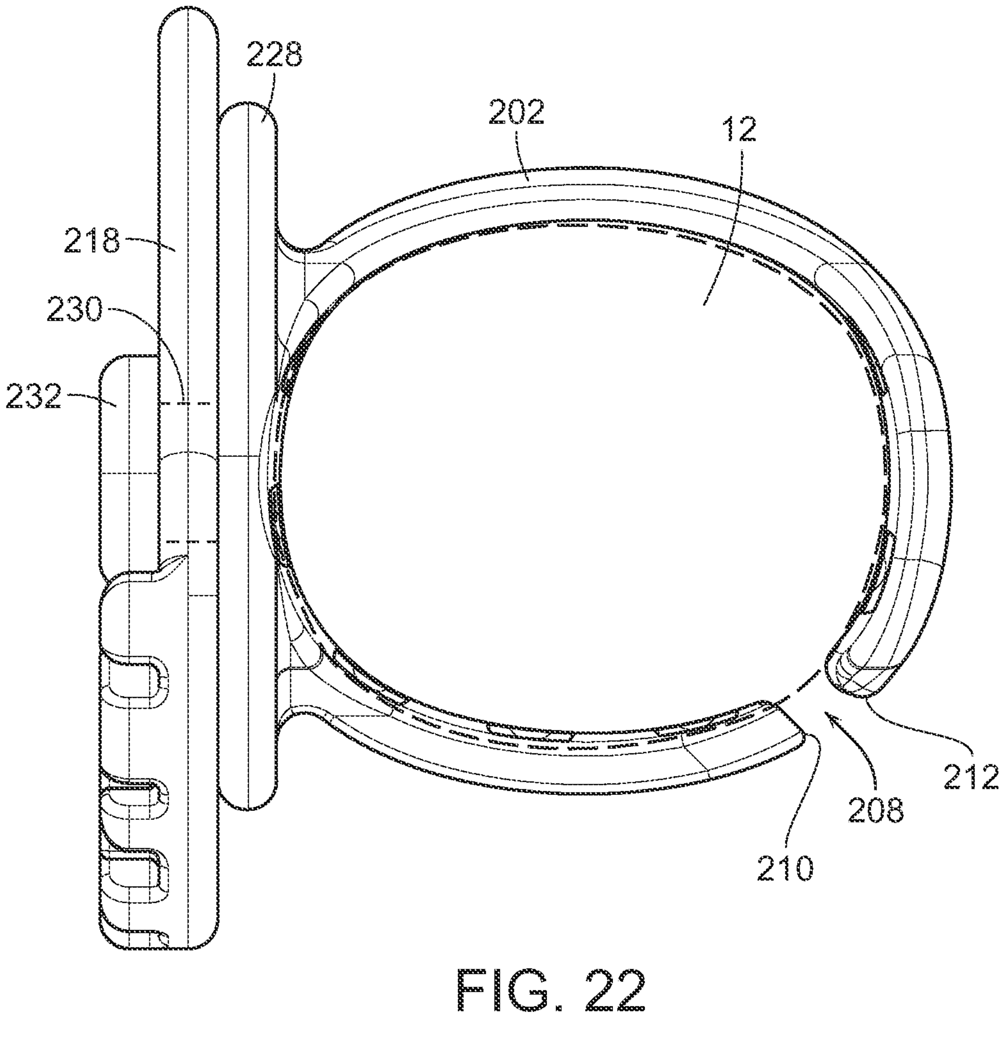
FIG. 22 is an opposite end view of FIG. 21.

The plectrum 218 has an aperture 234 formed therein of a substantially similar or slightly larger diameter than the enlarged end 232 of post 230, such that the post can be inserted therethrough, as illustrated in FIGS. 15 and 17. A channel 236 extends from the aperture 234 having a diameter slightly larger than the diameter of the post 230, enabling the post to slide along a length of the channel 236, and thus moving the plectrum 218, as desired. FIG. 17, in particular, illustrates, with the directional arrows, the movement of the plectrum 218 relative to the band 202 as the plectrum 218 is slid along a length of the channel 236 and also rotated with respect to the post 230.

With reference to FIGS. 18-22, the band 202 is inserted over the user's finger, such that the tip 18 of the finger extends through the first and second openings 204 and 206 thereof so as to extend freely from the guitar pick 200. The plectrum 218 may be attached to the band 202, as described above, either before or after the band 202 is inserted onto the user's finger.

Figure 3:
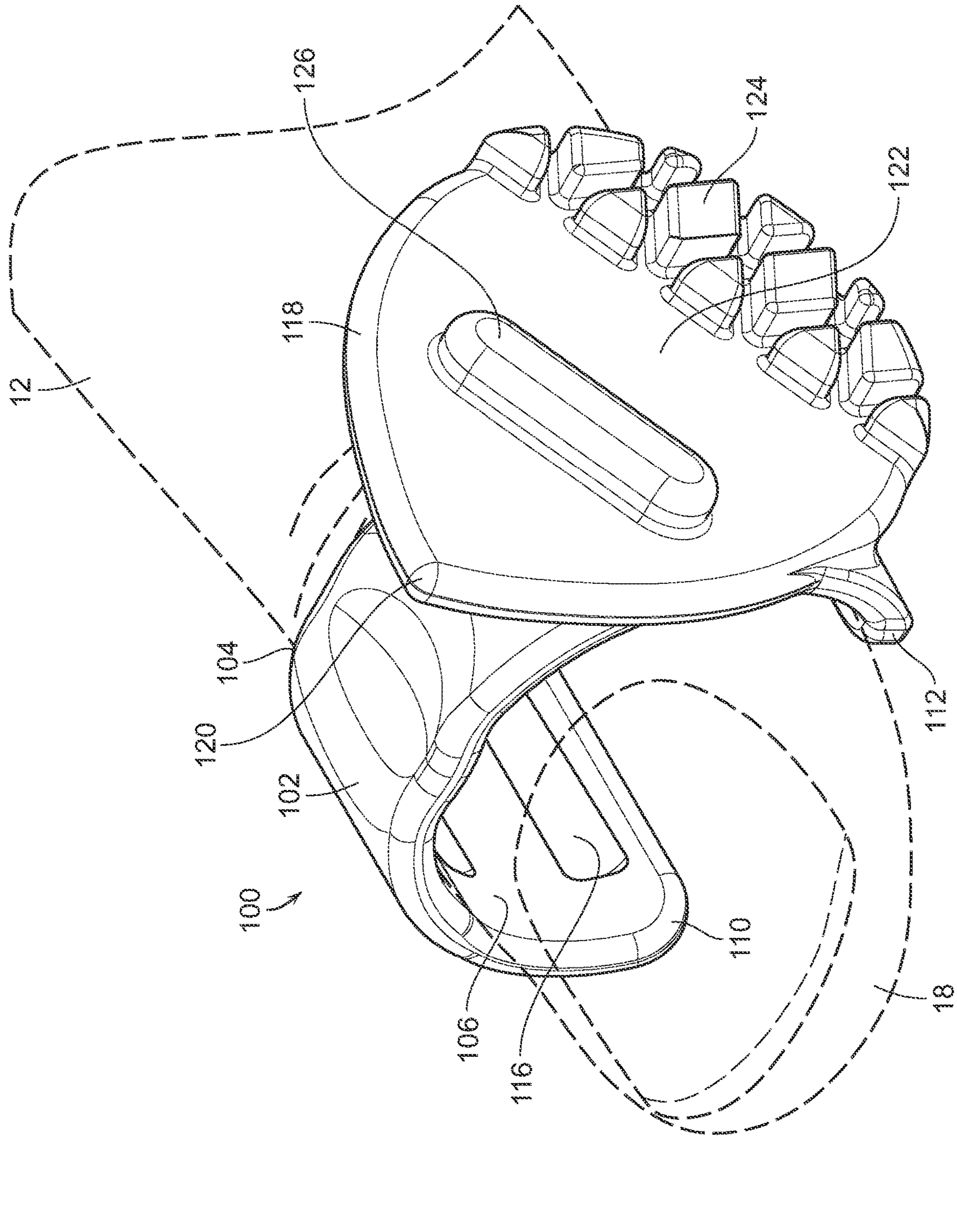
FIG. 3 is a side perspective view of a guitar pick embodying the present invention disposed on a finger, in accordance with the present invention.
Figure 23:
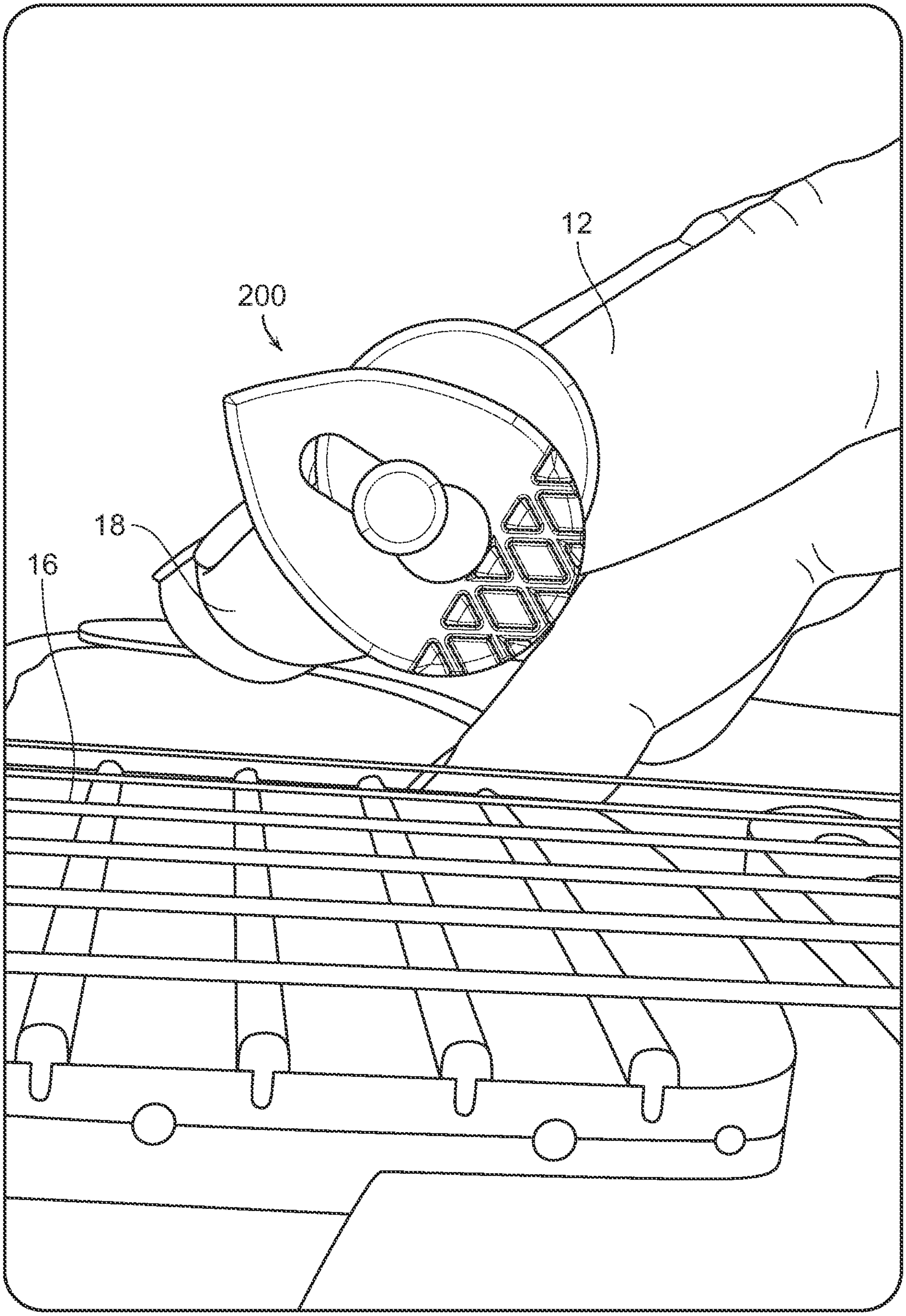
FIG. 23 is an environmental perspective view illustrating the guitar pick of the present invention disposed upon a finger of the user and enabling tapping of the guitar strings.

With reference now to FIG. 23, this view is similar to FIG. 3, wherein the guitar pick 200 is disposed upon the user's finger 12, with the fingertip 18 extending therethrough and exposed so as to be used for tapping, along with any other of the fingers or thumb that the user desires to use while tapping the strings 16 in the tapping playing style.

Figure 24:
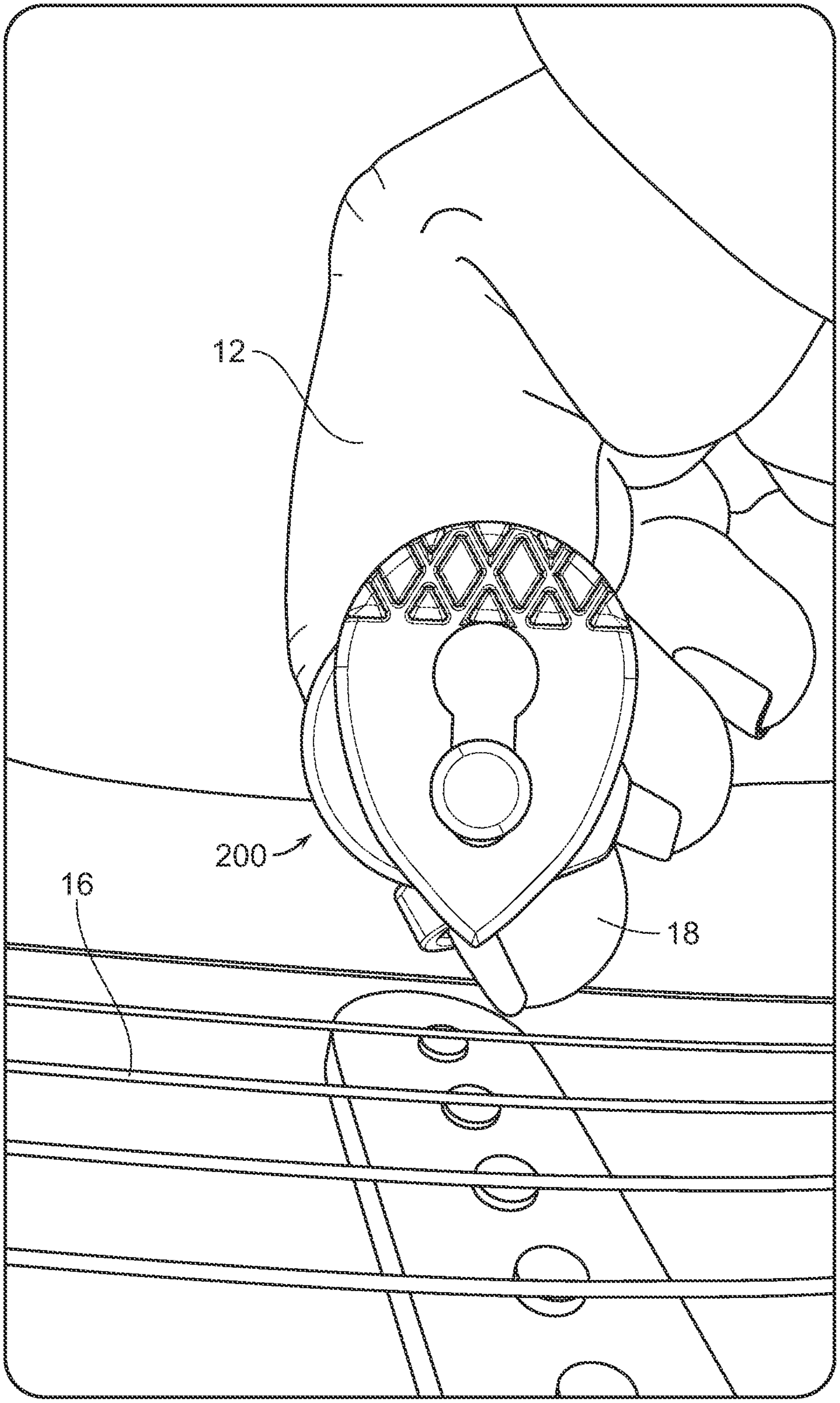
FIG. 24 is an environmental perspective view illustrating the pick being brought into engagement with the guitar strings, in accordance with the present invention.
Figure 25:
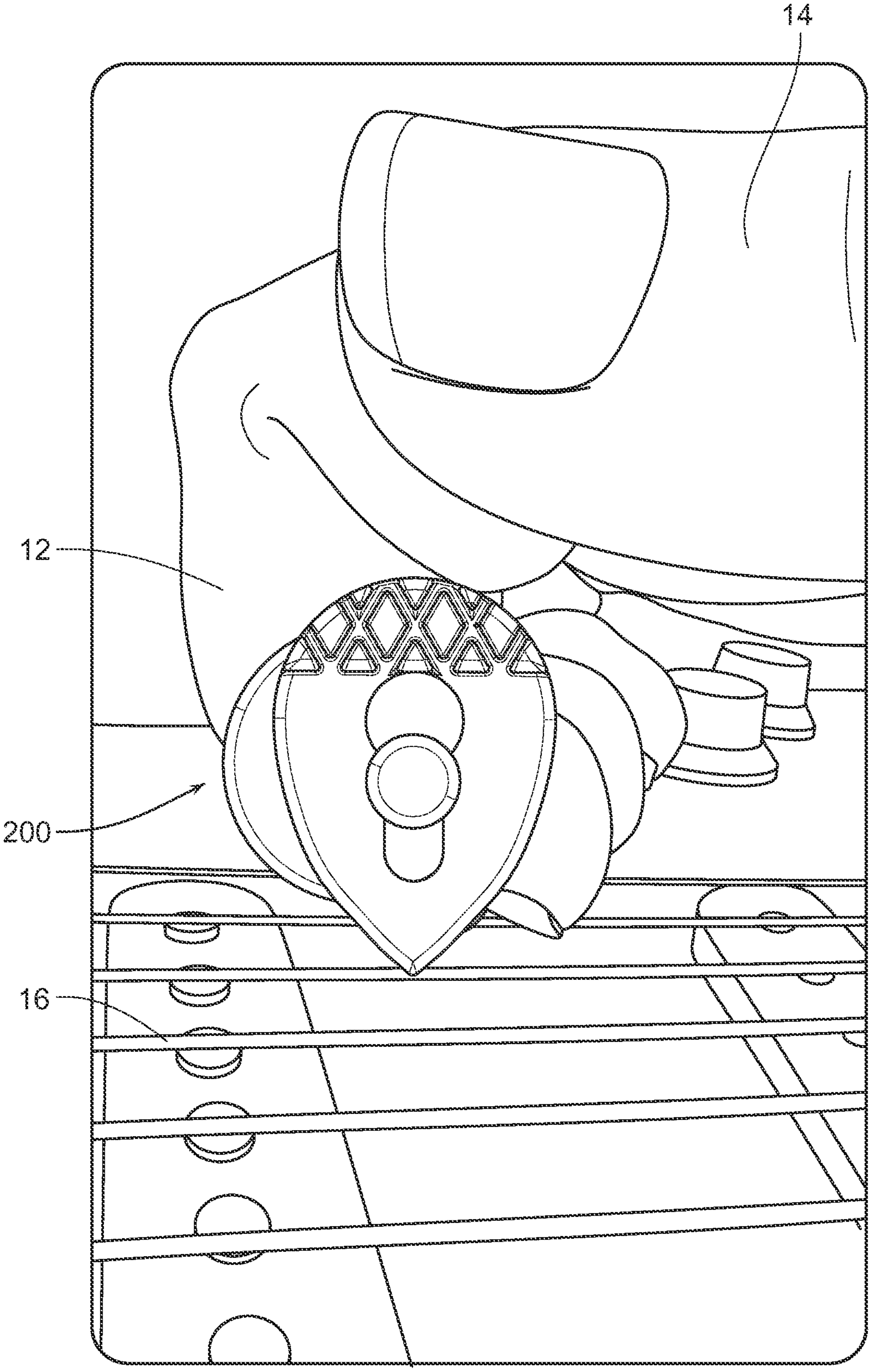
FIG. 25 is an environmental perspective view similar to FIG. 24, illustrating the guitar pick of the present invention and hand of the user in a position for a different playing style.

With reference now to FIG. 24, this view is similar to FIG. 12 above. However, it will be noted that in FIG. 12 the tip 120 of the plectrum 118 is not completely vertical with respect to the guitar strings 16, which would be desirable. However, in the embodiment illustrated in FIGS. 14-25, the plectrum 218 can be rotated as desired so as to create the desired angle, which is typically perpendicular to the guitar strings 16. The position illustrated in FIG. 24 is similar to FIG. 12, in that the user is strumming the strings 16 of the guitar or other instrument in a somewhat relaxed or extended finger position. However, as illustrated in FIG. 25, the user may curl his or her fingers 12 more inwardly in order to fast or hard pick. With the change of the user's finger position, the plectrum 218 may be adjusted. This can be done by the user pressing his thumb, such as against the riser 224, and/or the thumb rest area 222 or other portion of the top surface or edge of the plectrum 218 to rotate the plectrum 218, as necessary or desired, to achieve the desired pick angle, which is typically perpendicular to the strings 16. Moreover, by moving the fingers closer to the palm, the plectrum 218 may be desirably moved closer to the strings 16, such as by moving the plectrum 218, such that the post 230 slides along a length of the channel 236 so as to position the plectrum 218 at a desired height or extension relative to the band 202 and at the desired placement adjacent to the guitar strings 16. Alternatively, or in addition, the entire guitar pick 200 may be moved along a length of the user's finger 12 as desired, such as by pressing the user's thumb against the one or more risers 224 so as to properly position the pick 200 on the user's finger 12.

Although several embodiments have been described in detail for purposes of illustration, various modifications may be made without departing from the scope and spirit of the invention. Accordingly, the invention is not to be limited, except as by the appended claims.

What is claimed is:

1. A guitar pick, comprising:

a generally cylindrical band having a first open end and a second open end for insertion of a fingertip therethrough; and a plectrum disposed on the band, the plectrum having a generally triangular or tear drop configuration and defining a string engaging tip and a thumb rest formed on a top surface thereof wherein the plectrum includes a first riser extending from an upper surface thereof adjacent the thumb rest, and a second riser extending from the upper surface of the plectrum in spaced relation to the first riser, the thumb rest being disposed between the first and second risers.

2. The guitar pick of claim 1, wherein the band has a semi-cylindrical flexible diameter with a gap formed between adjacent side edges of the band.

3. The guitar pick of claim 1, including a convex nodule formed on an inner surface of the band that reduces finger-band inner surface contact area.

4. The guitar pick of claim 1, wherein the first riser comprises a plurality of spaced apart projections.

5. The guitar pick of claim 1, wherein the plectrum is detachably connected to the band by means of a post affixed to the band which extends through an aperture of the plectrum.

6. The guitar pick of claim 5, including a channel extending from the plectrum aperture that slidably receives the post therein.

7. A guitar pick, comprising:

a generally cylindrical band having a first open end and a second open end for insertion of a fingertip therethrough; and a plectrum disposed on the band, the plectrum having a generally triangular or tear drop configuration and defining a string engaging tip and a thumb rest formed on a top surface thereof; and a convex nodule formed on an inner surface of the band that reduces finger-band inner sur tact area;

wherein the plectrum includes a first riser extending from an upper surface thereof adjacent the thumb rest, and a second riser extending from the upper surface of the plectrum in spaced relation to the first riser, the thumb rest being disposed between the first and second risers.

8. The guitar pick of claim 7, wherein the first riser comprises a plurality of spaced apart projections.

9. A guitar pick, comprising:

a generally cylindrical band having a first open end and a second open end for insertion of a fingertip there-through; and a plectrum detachably and rotatably connected to the band when in use by means of a post affixed to the band which extends through an aperture of the plectrum, the plectrum having a generally triangular or tear drop configuration and defining a string engaging tip;

wherein the plectrum includes a riser extending from an upper surface thereof adjacent the post; and wherein the plectrum includes a channel extending from the plectrum aperture away from the first riser slidably receiving the post.

10. The guitar pick of claim 9, including a nodule formed on an inner surface of the band that reduces finger-band inner surface contact area.

11. The guitar pick of claim 9, wherein the first riser comprises a plurality of spaced apart projections.

12. The guitar pick of claim 5, wherein the plectrum is rotatably disposed about the post when in use.

* * * * *